(12) United States Patent
Trainer

(10) Patent No.: US 7,784,206 B2
(45) Date of Patent: Aug. 31, 2010

(54) SYSTEM AND METHOD FOR MEDIA DISPLAY

(76) Inventor: Charles Trainer, 19 Lafayette Rd., Ipswich, MA (US) 01938

(*) Notice: Subject to any disclaimer, the term of this patent is extended or adjusted under 35 U.S.C. 154(b) by 221 days.

(21) Appl. No.: 12/041,083

(22) Filed: Mar. 3, 2008

(65) Prior Publication Data

US 2008/0209783 A1    Sep. 4, 2008

Related U.S. Application Data

(60) Provisional application No. 60/904,465, filed on Mar. 2, 2007.

(51) Int. Cl.
*G09F 21/02* (2006.01)
(52) U.S. Cl. .................. 40/586; 40/590; 40/606.02; 280/47.24; 280/211
(58) Field of Classification Search ............ 40/586, 40/590, 606.02, 602, 606.01; 180/6.2; 280/47.24, 280/211, 213, 288.4
See application file for complete search history.

(56) References Cited

U.S. PATENT DOCUMENTS

| 3,167,874 | A | * | 2/1965 | Pogue | 40/607.03 |
| 3,986,722 | A | * | 10/1976 | Patterson | 280/16 |
| 5,403,641 | A | * | 4/1995 | Linville et al. | 428/113 |
| 6,677,021 | B1 | * | 1/2004 | Barnette et al. | 428/40.1 |
| 6,843,012 | B1 | * | 1/2005 | Dodd | 40/586 |
| 7,617,626 | B2 | * | 11/2009 | Balscheit | 40/590 |
| 2004/0102166 | A1 | * | 5/2004 | Morita et al. | 455/152.1 |
| 2005/0205310 | A1 | * | 9/2005 | Pelz | 180/6.2 |
| 2006/0202439 | A1 | * | 9/2006 | Kahlert et al. | 280/47.24 |
| 2007/0205241 | A1 | * | 9/2007 | Mourao | 224/401 |

* cited by examiner

*Primary Examiner*—Gary C Hoge
(74) *Attorney, Agent, or Firm*—Mark S. Leonardo; Brown Rudnick LLP

(57) ABSTRACT

A media display system and method is provided. The media display system comprising a two wheeled base configured for a operator to stand on; a steering column operatively connected to said base; a display means for a user standing on said base to hold and steer, said display mean allowing messages to be displayed; a handle operatively connected to said display means; and at least one wheel operatively connected to said media display such that said media display system can move 365 degrees.

15 Claims, 4 Drawing Sheets

SYSTEM AND METHOD FOR MEDIA DISPLAY

CROSS-REFERENCE TO RELATED APPLICATION

This patent application claims priority to U.S. Provisional Application Ser. No. 60/904,465 filed in the U.S. Patent and Trademark Office on Mar. 2, 2007 by Charles Trainer, the entire contents of which being hereby incorporated by reference.

BACKGROUND

1. Technical Field

The current disclosure relates to media display and more particularly to a media display system and method incorporating a propelling device and a display for various types of media, which can reach large audiences.

2. Background of the Invention

Media and signage displays are important for advertising, public art, public service announcements and other instances where it is important to portray a message to a large group of people. Some such events where messages and/or advertisements may need to be displayed include, gliding tradeshow exhibits, handheld political campaigns, self marketing, lead or pace vehicles for events that are in motion, road sports events, retail store front promotions, information services at transportation hubs, gliding exhibits in parades and gliding tours.

A few examples of current advertising and media display methods include billboards, post bills (posters), banners, building wraps, bus shelter ads, public restrooms ads, public transit ads, taxi ads, push cart ads, fly-over aircraft, pedal craft ads, walking human ads and many other methods that reach a large variety of people. Many of these methods are stationary and others move only on roads or in the air. Furthermore, most of them are extremely costly. Unfortunately, many of these methods of advertising are commonplace and ignored by many.

Additionally, systems for sailing on land, water or ice are propelled by the wind, generally require someone who is youthful and in good health to operate because they require balance, coordination, and strength to maneuver. These methods generally allow a person in or on a cart with wheels, skis, ice skates, boats, surf boards, long skateboard, ice skates with the apparatus that includes a flexible sail made of a fabric or plastic sheeting. Most of the fore-mentioned sailing types require energy, endurance and skill by the operator and cannot be performed well without hours of training.

SUMMARY

Therefore, it is desirable to provide a system for media display that is easy to use, cost effective and can display media to a large group of people in a short period of time. Accordingly, a system and method for media display is disclosed. The media display system includes a display means, generally an air foil, that is operatively connected to a modified motorized base with wheels such as those systems provided by Segway Inc.™ of Bedford, Mass. In one embodiment, this system includes a two wheeled base configured for a operator to stand on, a steering column operatively connected to the base, a display means for a user standing on said base to hold and steer, a handle means operatively connected to said display means, and at least one wheel operatively connected to said media display such that said media display system can move 365 degrees. The base and steering column can be a modified SEGWAY™, dynamic balancing personal vehicle, device.

A method of advertising is also provided. The method includes the steps of standing on a modified SEGWAY™, dynamic balancing personal vehicle, device, holding a media display having a wheel operatively connected to said display means such that said media display system can move 365 degrees, holding a handle operatively connected to said media display at approximately waste level of an operator, and displaying media on said media display.

DETAILED DESCRIPTION OF THE INVENTION

Many known systems and methods for media display can only be operated outdoors and on smooth flat services. Also, many of the devices currently known require a lot of space as they need large areas to make turns and/or move. Thus, a system and method that can be used in small spaces, large public building or has the ability to go off road is desirable.

It is envisioned that the system and method according to the present disclosure can be used in a variety of locations including outdoor sporting and public events on cut grass, hard packed sand/dirt, and semi-loose gravel. Furthermore, the system may be used at a large variety of events including: The Olympics™, PGA™ golf tournaments, pre-game promotion at large outdoor field sporting tournaments, large outdoor concerts series, outdoor public markets, outdoor creative arts festivals, large political outdoor gatherings, at the waters edge at large boating races, or any event that occurs off-road.

The system allows a message to reach large groups of people in a short period of time. The advertising system allows for operation in large public buildings, in small spaces, or in areas that are not flat, hard or smooth. The steer technology of the customized SEGWAY i2™, dynamic balancing personal vehicle, which allows the operator to control with their feet and legs only, which reduces clutter and provides a sleek look and an unobstructed tacking area for the media display. The method and system according to the present disclosure incorporates a tighter turning radius to improve mobility, especially in small open areas. Furthermore, the system is easy to operate and takes less endurance strength.

Figure 1:
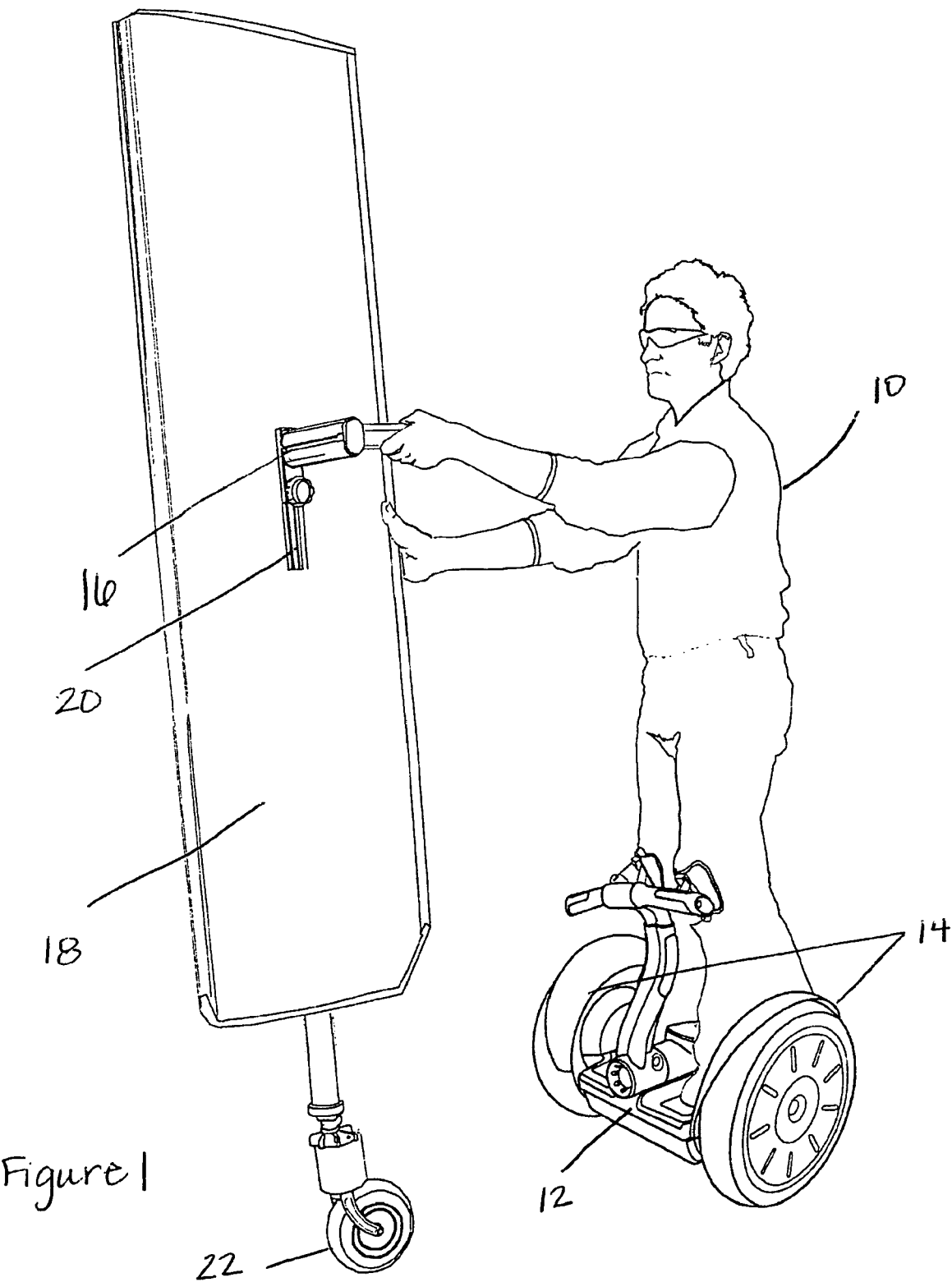
FIG. 1 is a perspective view of an embodiment of the system according to the present disclosure.

Now turning to the figures, FIG. 1, depicts an exemplary embodiment according to the present disclosure. An operator 10, stands on a base 12. Base 12 is operatively connected to wheels 14. The base 12 and wheels 14, can be a SEGWAY™, dynamic balancing personal vehicle, device as provided by Segway Inc. The operator 10 holds handle 16. Handle 16 is operatively connection to display means 18. There may be a track 20 in display means 18 such that handle 16 slides into track 20 to allow the connection. A gurney wheel 22 is attached to the bottom of media display 18. Wheel 22 allows for 360° rotation. Wheel 22 can be a small wheel or large wheel depending on the terrain where the system is being used. This allows operator 10 to maneuver the device in a variety of directions and turn the device quickly and precisely if needed. This particular embodiment allows for three points, a tripod styled base/foundation of support that allows for freedom of movement and stability of the operator. Base 12 allows for the operator to stand on and provide the operator with a way to move the display means 18 without standing on the ground. Both drive systems (SEGWAY™ i2 & x2, dynamic balancing personal vehicle, models) that can be used, among others, as base 12 can be propelled in a variety of different directions. This system also allows the operator to maneuver display means 18 to meet the sight lines the audience placement demands of any given project.

Figure 2:
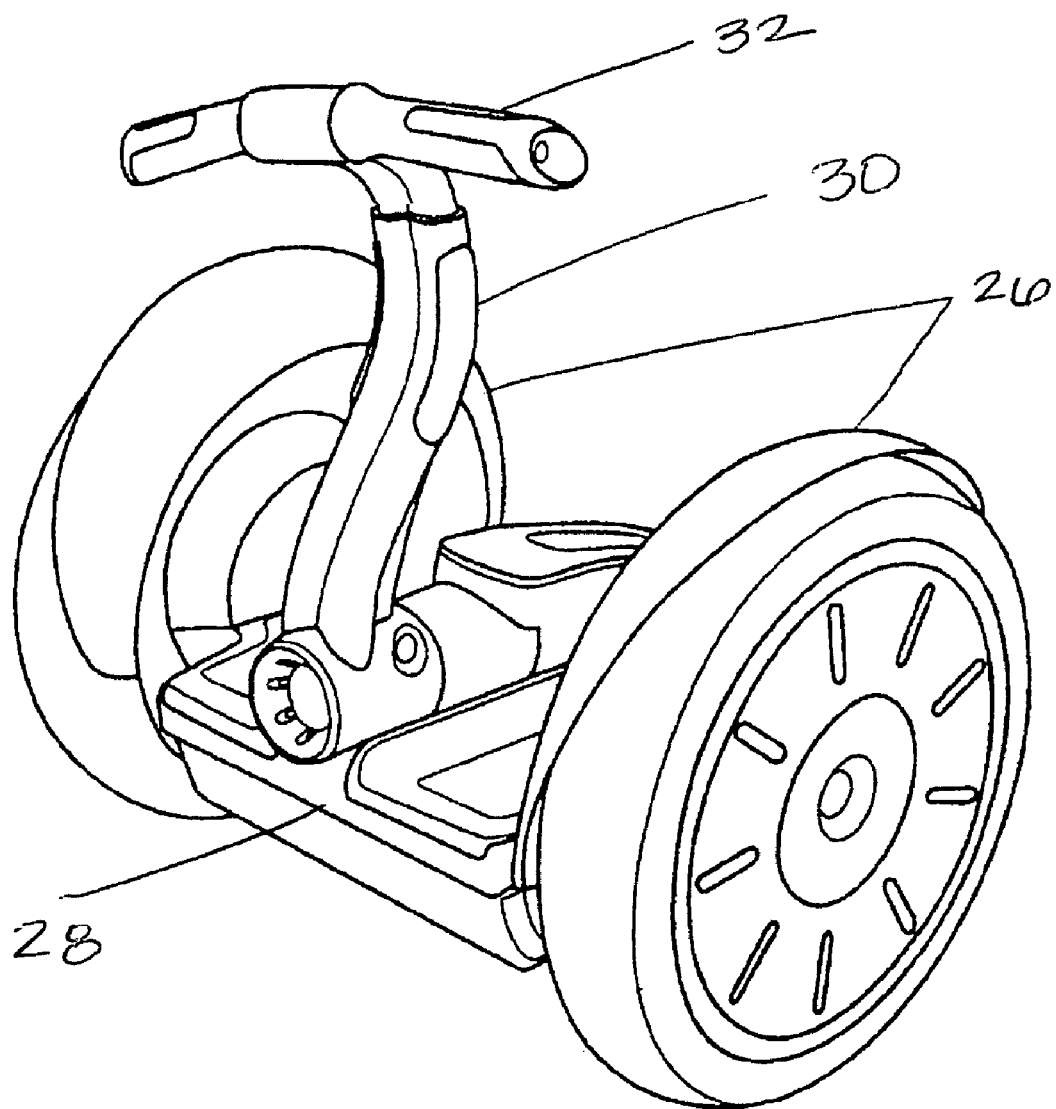
FIG. 2 is a perspective view of the base and wheels portion of one embodiment of the system according to the present disclosure.

FIG. 2 shows the base and wheels portion of the system according to an exemplary embodiment. In this embodiment, a modified SEGWAY™, dynamic balancing personal vehicle, device is used. The SEGWAY™, dynamic balancing personal vehicle, incorporates Segway Smart Motion™ and is controlled by a network of sensors, mechanical assemblies, propulsion, and control systems. An operator uses his or her body position to move and steer the SEGWAY™, dynamic balancing personal vehicle, device. The SEGWAY™, dynamic balancing personal vehicle, device shown in FIG. 2 has wheels 26 and base 28. A steering column 30 is shorter than the standard SEGWAY™, dynamic balancing personal vehicle, device in this embodiment. This modification of the SEGWAY™, dynamic balancing personal vehicle, devices allows for the user to effectively steer the media display system. The handles 30 are reverse from a standard SEGWAY™, dynamic balancing personal vehicle, device to allow the user to use their knees to help maneuver the system.

Figure 3:
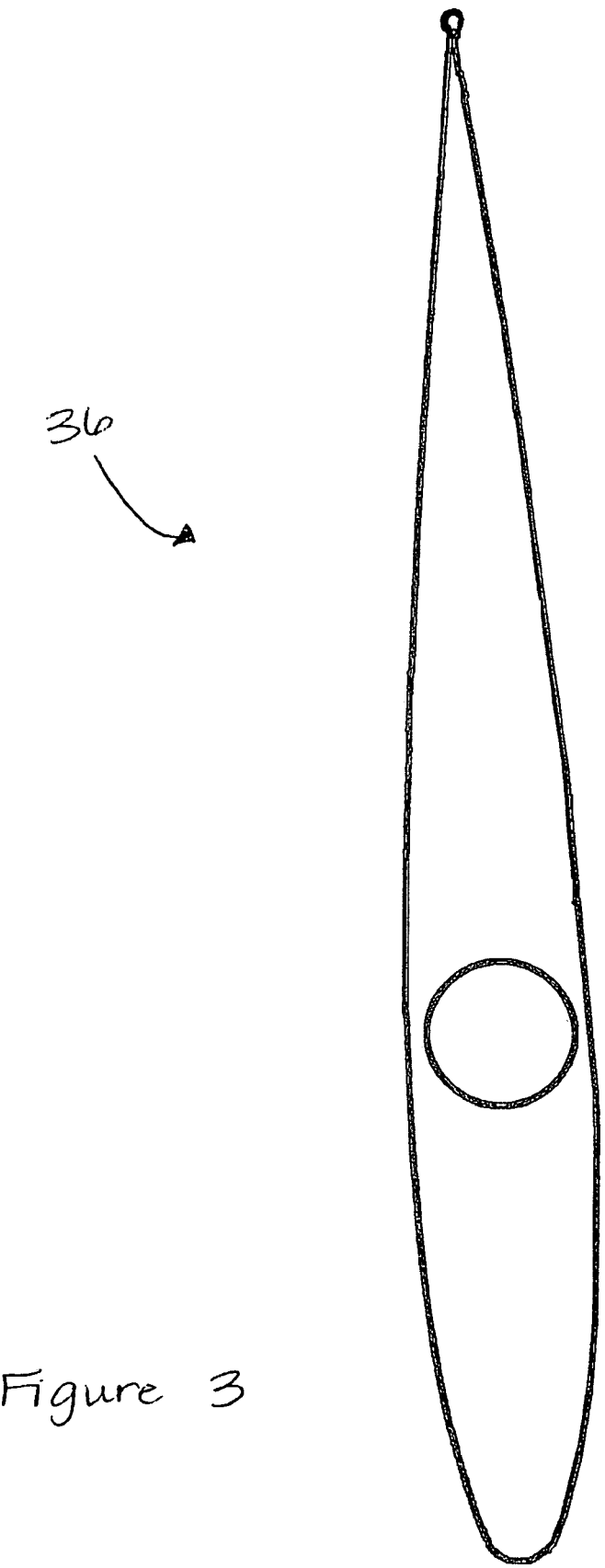
FIG. 3 is a bottom view of the mast of an exemplary embodiment according to the present disclosure.

The display means, such as an airfoil, is shown in FIG. 3. FIG. 3 is a bottom view of the display means 36. The display structure 36 may be constructed with an internal mast, surrounded by sign foam and a hard skin made of fiberglass. In one embodiment, display means 36 sub-finish is a under laminate reflective sheeting (from, the 3M Corporation™ of St. Paul, Minn.) called Scotchlite® brand, (White color) DiamondGrade® sheeting. This is an energy efficient non-illuminated system that is iridescent during the day light and highly reflective at night. Display means 36 can be can be double sided and the convex surfaces may be highly visible from a wide viewing angle. The artwork can be printed and applied on top of the reflective surface. In one embodiment, the display means is printed (vivid digital printing: (4) four color, up to (6) six color, inkjet press using solvent inks for long life) on clear cling graphic film. The printed media (the final over laminate) allows for great variety of images and/or advertising to be displayed. Display means 36 can display large or small messages and allows for many people to see the message from a distance.

In another embodiment, the display means allows for the advertisement or message to be electronically displayed. Thus, media may be dispatched and monitored from the computer of an advertising account executive, using real time Collaboration Technologies Incorporated (CTI Inc.™) software via FTTP over the Internet and/or cellular phone networks, finally arriving via wire-less handheld on board or through a similar connection to the system according to the present disclosure.

The operator of the media display system can control distribution and an IT system can track performance data from the field automatically. The operator may also interact with viewers. Thus information can be compiled and the file data can be transmitted. The operator can manually track interactions data on a preplanned schedule. A final summary report can be sent via e-mail at the end of the project.

The display means can be changeable to allow for ease of changing the advertisement or message. One such changeable media display can include electronic paper such as that provided through E INK Corporation™. E paper technology is thin, light, flexible and updated by wireless connectivity via local hot spots made possible from Plastic Logic™.

In another embodiment, the display means can be mounted on a mast that is operatively connected to the base and wheels rather than only being connected to the base by way of the operator. For example, there can be a permanently or removably mounted c-channel extrusion running up the mast and a permanently or removably mounted kerning, flexible solid tube wrapped in a fiberglass cloth type hinge, to the airfoil or display means. The displays means can have free-swinging forward leaning media that can automatically turn, on level grades, in the direction of the transporter as it turns. This is desirable for maximum visibility while moving around corners or navigating around objects.

Figure 4:
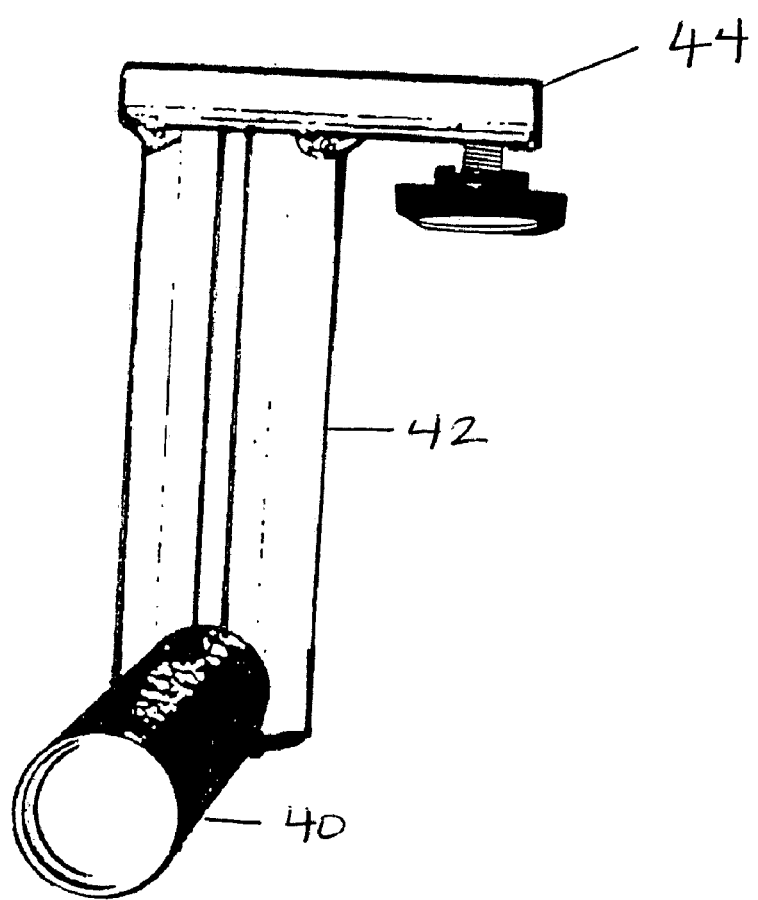
FIG. 4 is perspective view of the handle of an exemplary embodiment according to the present disclosure.

FIG. 4 depicts the handle that is attached to the media display system. The handle is operatively connected to the display means via a hardware track, (reset in the surface of the display means) in the mid section of the display means. The handle may be adjustable for operators of different heights. The handle has a plastic hand piece 40 operatively connected to an aluminum connection 42. The aluminum connection 42 is coupled to an aluminum rail 44 such that rail 44 can slide into the track of the display means. An operator steers the media system via the handle and the tapered trailing edge of the display means. A variety of handle configurations can be contemplated according to the present disclosure.

The system also can include a variety of features to allow for Bluetooth communication and/or digital camera features. For example: such as an iPhone™ from Apple, Inc. can be included in the media display system. From the Segway i2 & x2 the Info Key™ can be remounted at eyelevel on the media air foils hardware (arm/handle). This Info Key™ is the Segway's Bluetooth wireless controller. Other embodiments can include CPU with WIFI connection and real time collaboration web based software technologies, etc.

Many modifications to the system according to the present disclosure are contemplated. Other accessories that can be used with or on the media display system according to the present disclosure. These accessories include, but are not limited to, media display travel bag for shipping, hard travel case for shipping of Segway Transporter base and Eco Ads LeanSteer™ quick connector, Segway Hard Cases by GM® for storage of hand out materials, Segway 5 Watt LED Lithium-ion Lighting kits™ for night time operations, Bose™ Corp. mini satellite (wireless) sound systems for broadcasting audio, Segway i2 Lower Cargo Frame Kit for mounting PA, AV and lighting equipment, Segway Ramp Kit™ for loading into a vehicle, Segway LeanSteer Frame Tool-less Release™ for easy and fast set-ups, Segway Locking Kit™ for added security, and Segway Comfort Mats™ for alleviating fatigue on long days.

When an operator desires to operate the system according to the present disclosure, the operator starts the SEGWAY™, dynamic balancing personal vehicle, with the InfoKey, and then raises the display means, air foil to a balanced upright position with its wheel touching the SEGWAY™, dynamic balancing personal vehicle. The operator holds onto the handle located on the media display with one hand. The operator holds onto the edge on the display means with the other hand and finds the lower pivot point to adjust the balance of the display means. There may be an indicator light that signals when it is safe for an operator to step on such as after the (RED) status LED's change to (GREEN) status.

Then the operator steps onto the base while still holding the display means. The operator used his or her feet to propel the device forward. The operator drives the device using the steering shaft and operates the SEGWAY™, dynamic balancing personal vehicle, with (his or her), legs and feet.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A media display system comprising:
    a two wheeled base configured for an operator to stand on;
    a steering column operatively connected to said base;
    a display means for a user standing on said base to hold and steer said display means in front of and separate from said steering column of said base, said display means allowing messages to be displayed, wherein said display means is substantially in the shape of an airfoil;
    a handle operatively connected to said display means; and
    a single one wheel operatively connected to said media display such that said media display system can move 360 degrees.

2. The media display system of claim 1, wherein said media display is propelled by said two wheeled base.

3. The media display system of claim 1, wherein the media display is fiberglass.

4. The media display system of claim 1, wherein the media display includes an electronic media display that displays different messages over time.

5. The media display system of claim 1, wherein said media display defines a track to operatively connect said handle.

6. The media display system of claim 1, wherein the wheel endures use of the system on rough terrain.

7. The media display of claim 1, wherein the display means is substantially covered with laminate reflective sheeting.

8. A media display system comprising:
    a dynamic balancing personal vehicle having a base for an operator to stand on, two wheels rotatably connected to said base, a modified steering column connected to said base such that an operator can use knees to steer said dynamic balancing personal vehicle;
    a media display, said media display displaying an advertisement that has been printed on said media display wherein said media display is substantially in the shape of an airfoil;
    a handle operatively connected to said media display at approximately shoulder level of an operator such that said media display can be steered in front of said dynamic balancing personal vehicle;
    a single wheel operatively connected to said media display such that said media display can move 360 degrees and such that said media display is separate from, can be propelled by, and can be steered separately from said dynamic balancing personal vehicle.

9. The media display system of claim 8, wherein the media display is fiberglass.

10. The media display system of claim 8, wherein the media display includes an electronic media display that displays different messages over time.

11. The media display system of claim 8, wherein said media display defines a track to operatively connect said handle.

12. The media display system of claim 8, wherein the wheel endures use of the system on rough terrain.

13. A method of advertising, comprising the steps of:
    standing on a dynamic balancing personal vehicle having; two wheels rotatably connected to a base of said dynamic balancing personal vehicle, a steering column connected to said base such that an operator can use knees to steer said dynamic balancing personal vehicle;
    steering a media display having a single wheel operatively connected to said media display such that said media display can move 360 degrees and such that said media display can be steered in front of and separate from said;
    holding a handle operatively connected to said media display at approximately shoulder level of an operator to steer said media display; and
    displaying media on said media display, wherein said media display is substantially in the shape of an airfoil.

14. The method of claim 13, wherein the media is displayed electronically.

15. The method of claim 13, wherein said media display is propelled by said dynamic balancing personal vehicle.

\* \* \* \* \*